(12) United States Patent
Habermehl (10) Patent No.: US 8,015,773 B2
(45) Date of Patent: Sep. 13, 2011

(54) FASTENER WITH STEPPED HEAD FOR COMPOSITE DECKING

(75) Inventor: G. Lyle Habermehl, Gallatin, TN (US)

(73) Assignee: Simpson Strong-Tie Co. Inc., Pleasanton, CA (US)

( * ) Notice: Subject to any disclaimer, the term of this patent is extended or adjusted under 35 U.S.C. 154(b) by 0 days.

(21) Appl. No.: 12/013,839

(22) Filed: Jan. 14, 2008

(65) Prior Publication Data

US 2008/0175688 A1    Jul. 24, 2008

Related U.S. Application Data

(62) Division of application No. 10/269,906, filed on Oct. 11, 2002, now abandoned.

(51) Int. Cl.
*E04G 21/00*    (2006.01)
*E04G 23/00*    (2006.01)
*E04B 1/00*    (2006.01)
*E04B 2/30*    (2006.01)

(52) U.S. Cl. ............ 52/745.21; 52/747.1; 52/483.1

(58) Field of Classification Search ........... 52/745.21, 52/747.1, 483.1; 411/402, 399, 411, 424
See application file for complete search history.

(56) References Cited

U.S. PATENT DOCUMENTS

| | | | |
|---|---|---|---|
| 471,179 A * | 3/1892 | Jones | 411/424 |
| 933,865 A * | 9/1909 | Umholtz | 411/403 |
| 2,982,166 A | 5/1961 | Hobbs | |
| 3,396,996 A | 8/1968 | Raptis | |
| 3,456,972 A | 7/1969 | Drotar | |
| 4,509,767 A | 4/1985 | Brilando | |
| 4,572,720 A * | 2/1986 | Rockenfeller et al. | 411/387.1 |
| 4,763,456 A * | 8/1988 | Giannuzzi | 52/410 |
| 4,877,364 A | 10/1989 | Sorrentino | |
| 5,141,376 A * | 8/1992 | Williams et al. | 411/387.4 |
| 5,199,839 A * | 4/1993 | DeHaitre | 411/387.3 |
| 5,249,882 A * | 10/1993 | Nagoshi et al. | 411/399 |
| 5,256,019 A | 10/1993 | Phillips, II | |
| 5,516,248 A * | 5/1996 | DeHaitre | 411/387.2 |
| 5,531,554 A | 7/1996 | Jeanson et al. | |
| 5,919,020 A * | 7/1999 | Walther | 411/399 |
| 5,921,736 A | 7/1999 | Habermehl | |
| 6,074,149 A | 6/2000 | Habermehl et al. | |
| 6,254,326 B1 * | 7/2001 | Palm | 411/411 |
| 6,789,989 B2 * | 9/2004 | Walther | 411/186 |

OTHER PUBLICATIONS

Office Action mailed Oct. 23, 2003, U.S. Appl. No. 10/269,906.
Response to Office Action mailed Feb. 23, 2004, U.S. Appl. No. 10/269,906.
Office Action mailed Sep. 29, 2004, U.S. Appl. No. 10/269,906.
Response to Office Action mailed Jan. 31, 2005, U.S. Appl. No. 10/269,906.
Supplemental Response to Office Action mailed Feb. 7, 2005, U.S. Appl. No. 10/269,906.
Preliminary Amendment mailed Dec. 20, 2005, U.S. Appl. No. 10/269,906.
Response to Office Action mailed Mar. 10, 2006, U.S. Appl. No. 10/269,906.

(Continued)

*Primary Examiner* — Eileen Lillis
*Assistant Examiner* — Mark R Wendell
(74) *Attorney, Agent, or Firm* — Vierra Magen Marcus & DeNiro LLP (57) ABSTRACT

A fastener with a head having a stepped configuration in assist in drawing down a composite material about a fastener to reduce flagging.

8 Claims, 7 Drawing Sheets

OTHER PUBLICATIONS

Office Action mailed Jul. 2, 2007, U.S. Appl. No. 10/269,906.

Response to Office Action filed Aug. 30, 2007, U.S. Appl. No. 10/269,906.

Notice of Non-Responsive Amendment dated Nov. 13, 2007, U.S. Appl. No. 10/269,906.

Response to Notice of Non-Responsive Amendment filed Jan. 14, 2008, U.S. Appl. No. 10/269,906.

* cited by examiner

FASTENER WITH STEPPED HEAD FOR COMPOSITE DECKING

CLAIM OF PRIORITY

This application is a divisional application of U.S. patent application Ser. No. 10/269,906 filed on Oct. 11, 2002 now abandoned entitled "Fastener With Stepped Head For Composite Decking", which application is incorporated herein by reference.

SCOPE OF THE INVENTION

This invention relates to fasteners and, more particularly, for fasteners to secure composite lumber product.

BACKGROUND OF THE INVENTION

Composite wood is known and has been used, for example, as a substitute for wood in areas where wood can deteriorate quickly due to environmental conditions.

Composite wood products typically comprise mixtures of fibers such as waste wood fiber and plastic material preferably recycled plastic material. Such polymer-fiber composites are also known as synthetic wood, composite lumber, wood-polymer lumber and similar such names.

Such composite lumber and its methods of manufacture described, for example, in U.S. Pat. No. 6,344,268 to Stucky et al, issued Feb. 5, 2002; U.S. Pat. No. 5,759,680 to Brooks et al, issued Jun. 2, 1998 and U.S. Pat. No. 5,088,910 to Goforth et al, issued Feb. 18, 1992.

Such composite lumber is commercially available. One such product is manufactured under the trade mark TREX, by Trex Company, LLC of Winchester, Va. and consists of a polyethylene-wood fiber blend which is extruded into board dimensions for decking applications. Such polyethylene-wood composite boards in {fraction (5/4)} inch thickness have sufficient rigidity to be used as decking planks. Another similar composite wood product containing reclaimed plastic and wood fiber is sold under the trade mark CHOICEDEK by Weyerhaeuser Company of Tacoma, Wash. A similar product is sold under the trade mark WEATHERBEST by ABT Deck Inc. of Portland, Oreg. comprising wood fiber and encapsulated high density polyethylene. A further similar product is sold under the trade mark SMARTDECK by Eagle Brook Products Inc. of Chicago, Ill. and comprising a composite of oak fiber and plastic resins.

Such composite lumber products have a disadvantage referred to as "flagging" created by the use of screws and other fasteners to secure the composite lumber products as, for example, to underlying wooden joists in a decking application. The composite woods are of a plastic nature in the sense that they are, to some extent, plastically deformable. When a typical wood screw is driven into the composite lumber, the wood screw displaces the plastic material to the side with the result that the plastic material becomes displaced from under the head of the screw and urged outwardly therefrom so as to deform the upper surface of the composite material upwardly radially outside of the screw head forming a raised annular ring about the screw head. This raised annular ring presents a disturbing appearance.

It is sometimes possible to reduce the production of the raised annular ring as by drilling a hole through the composite wood product before inserting the wood screw, however, this involves an additional step and, therefore, increases the time and expense.

SUMMARY OF THE INVENTION

To at least partially overcome these disadvantages of previously known devices, the present invention provides a fastener with a head having a stepped configuration to assist in drawing down the composite material about a fastener to reduce flagging.

An object of the present invention is to provide a fastener which is adapted to extend through a composite wood product and secure the composite wood product to an underlying support structure.

Another object is to provide a fastener having a head which presents a plurality of downwardly directed axially spaced shoulders to engage the material of a composite plank and assist in drawing the material proximate the screw downwardly into the plank.

Another object is to provide a fastener, whether a threaded fastener or a nail, which is adapted to secure composite wood products to underlying support structures.

Another object is to provide a method of securing composite lumber to underlying structures.

Another object is a novel structure having composite wood members secured to a support structure by a fastener having a stepped head.

Accordingly, in one aspect, the present invention provides a fastener disposed about a longitudinal axis and having a head at an upper end, a tip at the other lower end and a shank extending from the head to the tip about the axis, in cross-section normal to the axis at any respective position along the axis, the head being circular about the axis and of a respective radius, the radius of the head reducing in a stepped manner towards the tip from an upper portion of the head having a largest radius to a lower portion of the head having a radius less than the largest radius but greater than a radius of the shank so as to present at least two downwardly directed annular shoulders spaced axially from each other, the upper portion of the head presenting an uppermost downwardly directed annular shoulder merging at a radially inward extent into the lower portion of the head, and the lower portion of the head presenting a lower downwardly directed annular shoulder merging at its radially inward extent into the shank.

In another aspect, the present invention provides a fastener disposed about a longitudinal axis and having a head at an upper end, a tip at the other lower end and a shank extending from the head to the tip about the axis, the head comprising a first disc portion and a second disc portion each disposed normal to the axis centered on the axis, the first disc portion disposed below the second disc portion and joining the second disc portion to the shank, the first disc portion extending radially beyond the shank to define a first shoulder surface directed axially toward the lower end about the shank, the second disc portion extending radially beyond the first disc portion to define a second shoulder surface directed axially toward the lower end about the first disc.

Preferably, the first disc has a radially outwardly directed first surface with an upper edge and a lower edge, the first side wall merging with the first shoulder surface at the lower edge of the first side wall, the first side wall merging with the second shoulder surface at the upper edge of the first side wall,

BRIEF DESCRIPTION OF THE DRAWINGS

Further aspects and advantages of the present invention will become apparent from the following description taken together with the accompanying drawings in which.

Each of FIGS. 9, 10, 11 and 12 comprises a side view similar to that of FIG. 3 of the head of a fastener in accordance with the third, fourth, fifth and sixth embodiments of the present invention.

DETAILED DESCRIPTION OF THE DRAWINGS

Figure 1:
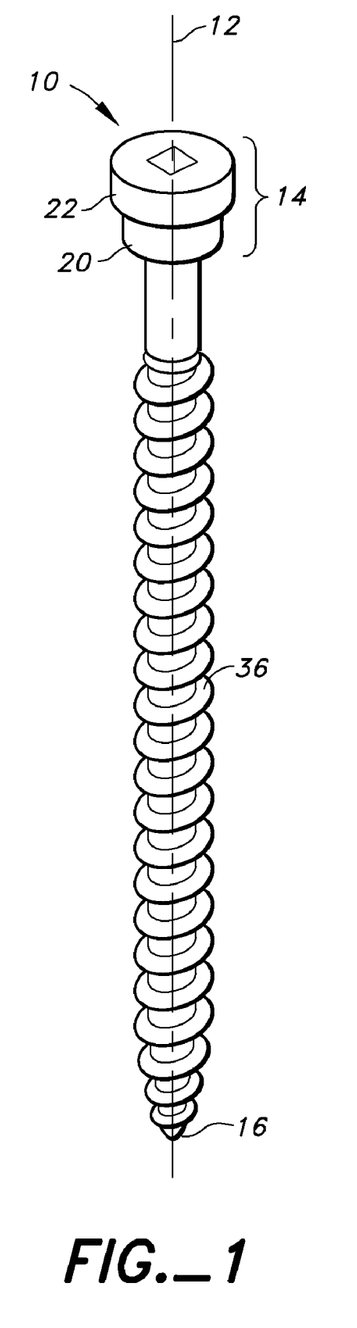
FIG. 1 is a pictorial view of a screw in accordance with a first preferred embodiment of the present invention.
Figure 4:
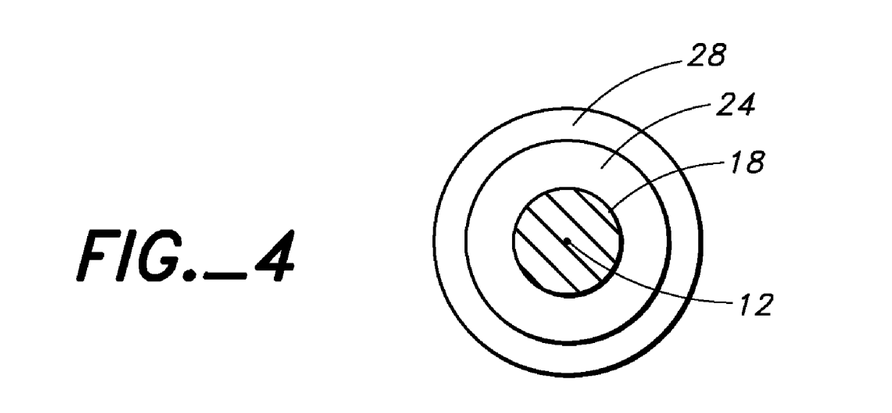
FIG. 4 is a cross-sectional end view of the screw of FIG. 1 along section line 3-3' in FIG. 3.

Reference is made first to FIG. 1 which shows as a first embodiment of the invention a screw 10 which is disposed about a longitudinal axis 12 and has a head 14 at an upper end, a tip 16 at a lower end and a shank 18 extending from the head 14 to the tip 16 about the axis 12. As best can be seen in the end cross-section of FIG. 4, in any cross-section normal to the axis 12 at any respective position along the axis, the head 14 is circular about the axis and has a respective radius.

As may be seen, the radius of the head is reduced in a stepped manner towards the tip 16. In this regard, the head 14 may be considered to comprise a first disc portion 20 and a second disc portion 22, each being cylindrical and disposed coaxially about the axis 12 normal to the axis. The first disc portion 20 is disposed below the second disc portion 22 and joins the second disc portion 22 to the shank 18.

The first disc portion provides a first shoulder surface 24 and a first side wall 26 the first side wall has an upper edge 27 and a lower edge 25. The first disc portion 20 extends radially beyond the shank 18 such that from a juncture 23 with the shank, the first disc portion 20 defines the first shoulder surface 24 about the shank 18. The first shoulder surface 24 is directed axially towards the lower end of the screw. The first shoulder surface 24 is an annular surface which extends radially outwardly from the junction 23 with a shank 18 to the lower edge 25 of the first side wall 26 where the first shoulder surface merges with the first side wall 26.

The second disc portion 22 similarly includes a second shoulder surface 28 and a second side wall 30 having a lower edge 29 and an upper edge 31. The second shoulder surface 28 extends as an annular surface extending radially beyond the first disc portion 20. The second shoulder surface 28 is directed axially towards the lower end of the screw. The first side wall 26 merges into the second shoulder surface 28 at the upper edge 27 of the first side wall. The second shoulder surface 28 merges into the second side wall 30 at the lower edge 29 of the second side wall 30. The second side wall 30 extends upwardly to its upper edge 31 where the second side wall 30 merges with a top surface 32 of the screw. The top surface 32 carries a screwdriver bit receiving recess 34 illustrated as a preferred square recess although other types of recesses such as slotted or star shaped and the like may be provided.

The screw is shown in FIG. 1 to have a conventional helical thread 36 thereabout. The screw may have various forms of threads formed thereon.

Figure 5:
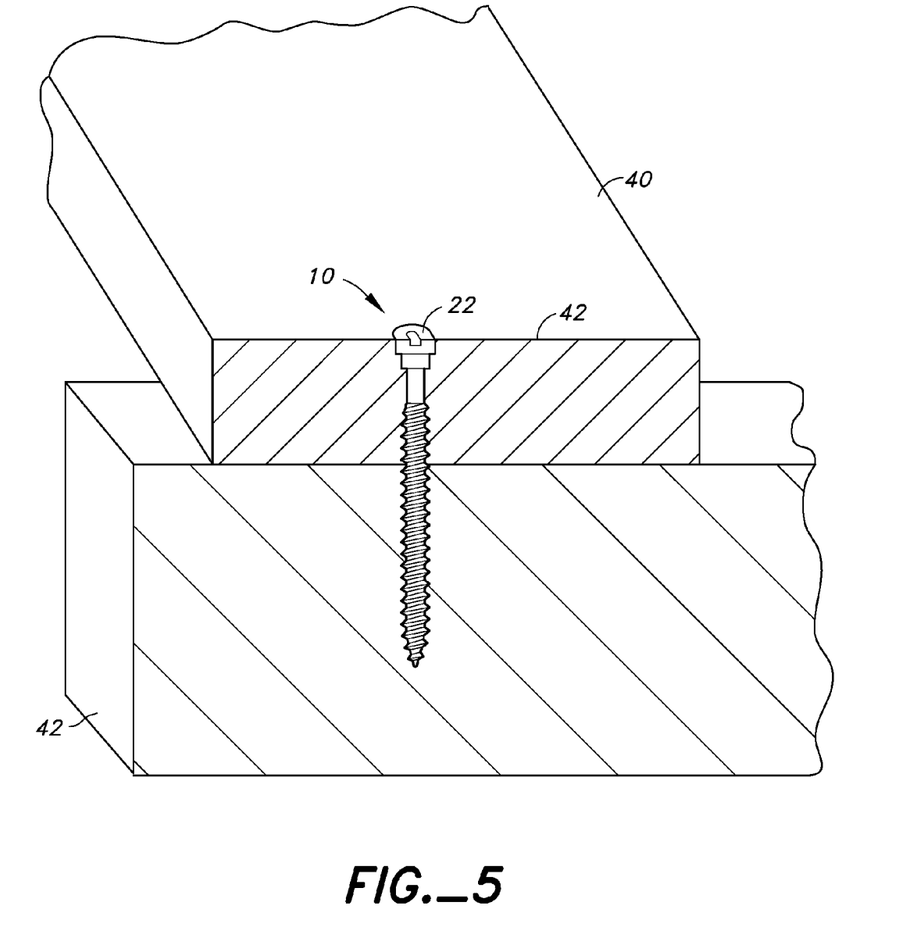
FIG. 5 is a schematic cross-sectional side view of a structure schematically showing a composite wood decking member secured to an underlying support structure joist by a screw in accordance with the first embodiment of FIG. 1.

Reference is made to FIG. 5 which schematically illustrates a fastener 10 in accordance with the first embodiment as used to secure a composite wood plank 40 to an underlying wood joist 42 with the screw 10 having been driven into the composite plank 40 to place the upper surface 32 of the screw 10 flush with an upper surface 42 of the composite plank 40. The composite wood plank preferably comprises a mixture of plastic and/or polymer resins and wood fiber.

In driving a screw 10 downwardly into the composite wood plank 40, the first and second shoulder surfaces 24 and 28 engage the material of the composite plank and draw the material of the plank downwardly into the plank as the screw is driven downwardly into the plank. As is to be appreciated, the first shoulder surface 24 initially engages the material of the plank and tends to draw material of the plank closest to the shaft 18 downwardly on relative movement of the screw downwardly. After the first disc portion 20 is drawn fully into the plank, only then does the second shoulder surface 28 come to engage the material of the plank and draw it downwardly. The screw 10 is driven from the upper surface of plank 40 downwardly to have the tip 16 and a forward portion of the shank 18 engage in joist 42 with the head 14 to be driven to be flush with the upper surface 42 of the plank.

It is believed that by incrementally drawing portions of the plastic material down with the screw, with localized deformation of the material of the plank by each shoulder surface assists in reducing the extent to which the surface 42 of the plank is deformed upwardly with compression of the plastic material.

Figure 6:
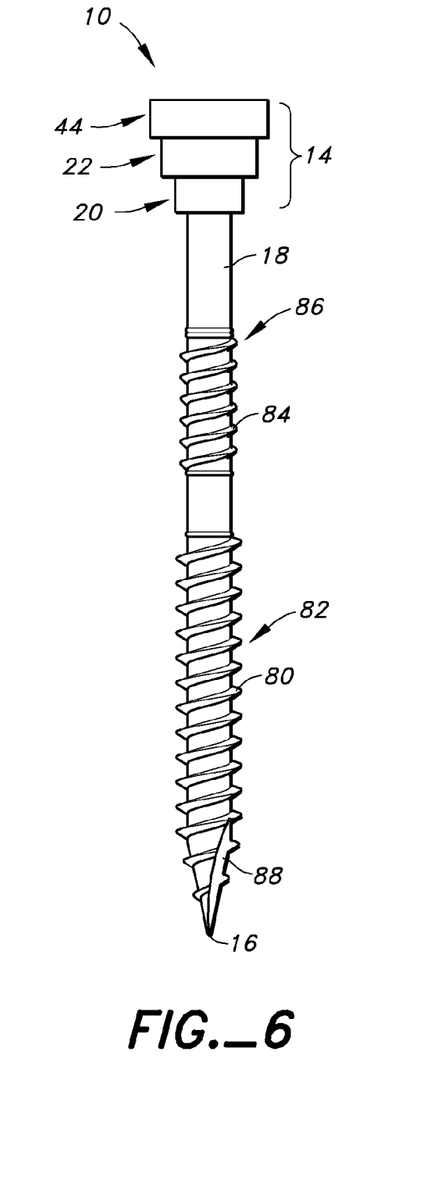
FIG. 6 is a side view of a screw in accordance with the second embodiment of the present invention.
Figure 7:
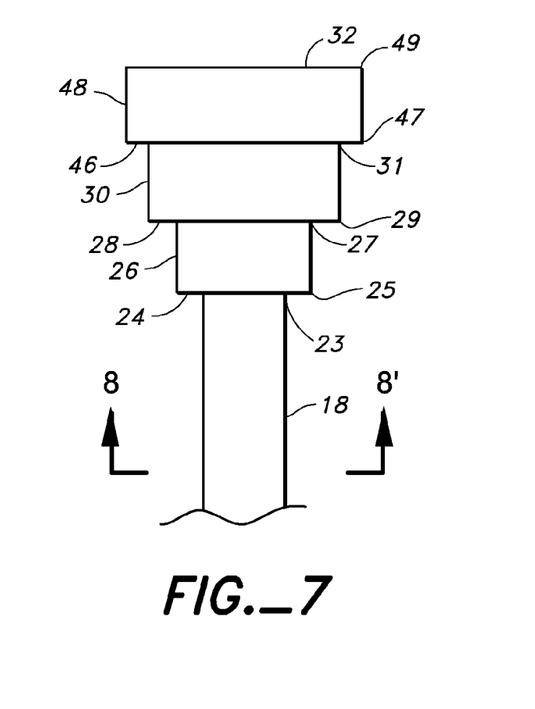
FIG. 7 is an enlarged side view of the head of the screw in FIG. 6.
Figure 8:
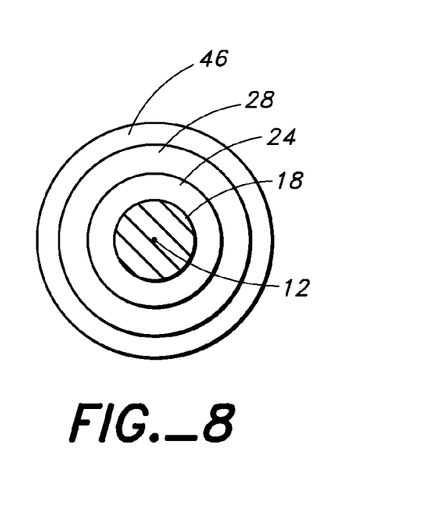
FIG. 8 is a cross-sectional end view of the screw of FIG. 6 along section line 8-8'.

Reference is made to FIGS. 6 to 8 which illustrate a second embodiment of a screw 10 in accordance with the present invention. The screw 10 of FIG. 6 differs from the screw 10 of FIGS. 1 to 4 insofar as a third cylindrical disc portion 44 is provided of a radius greater than the radius of the second disc portion 28. The third disc portion has a third shoulder surface 46 and a third side wall 48 with a lower edge 47 and an upper edge 49. The second side wall 30 merges into the third shoulder surface 46 at the upper edge 31 of the second side surface. The third shoulder surface 46 merges into the third side wall 48 at the lower edge 47 of the third side wall. The third side wall merges at its upper end 49 into a top surface 32 of the screw. In the embodiment illustrated in FIG. 5, three shoulder surfaces are provided which, on driving a screw downwardly into a workpiece, each engage material of the workpiece and tend to draw the material of the workpiece downwardly.

FIG. 6 shows the shank 18 as carrying enlarged threads 80 over a forward thread portion 82 of the shank 18 and reduced sized threads 84 over a rear thread portion 86, preferably the threads over the forward thread portion 82 are of larger size than the threads 84 over the rear thread portion 86 in a manner as is taught in the screws illustrated in U.S. Pat. No. 6,074,149 to Habermehl et al, issued Jun. 13, 2000. As in this U.S. patent, the screw 10 is preferably incorporated at the tip with a self-drilling or augering and self-tapping configuration which is assists each screw in penetrating into the workpiece. The augering tip has axially extending cut-out portions 88 as shown only in FIG. 6, but preferably, with two cut-out portions at diametrically opposed locations.

Reference is made to FIGS. 9 to 12 which illustrate cross-sectional side views of the heads of screws in accordance with the present invention illustrated to be similar to the screw of FIGS. 1 to 4 and having, effectively, two discs.

Figure 2:
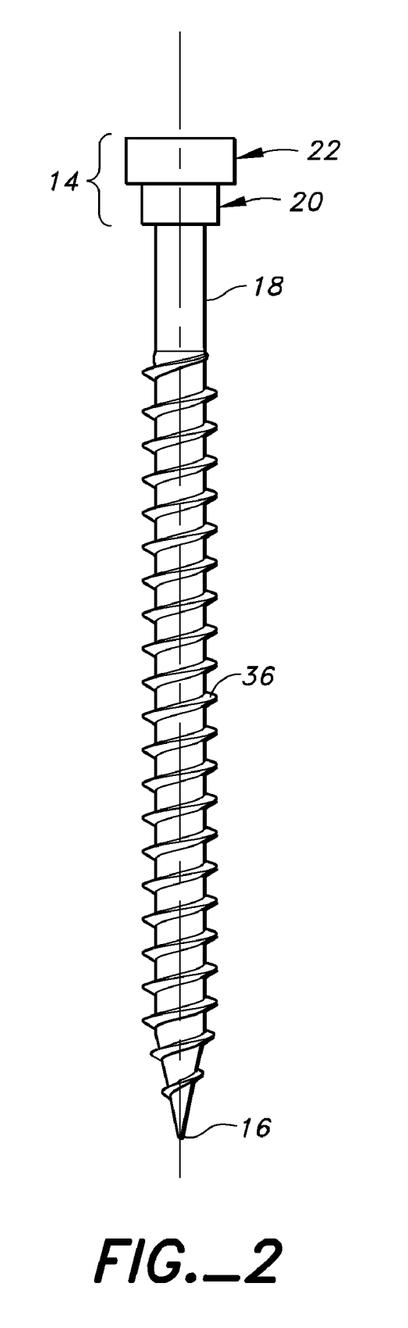
FIG. 2 is a side view of the screw of FIG. 1.
Figure 3:
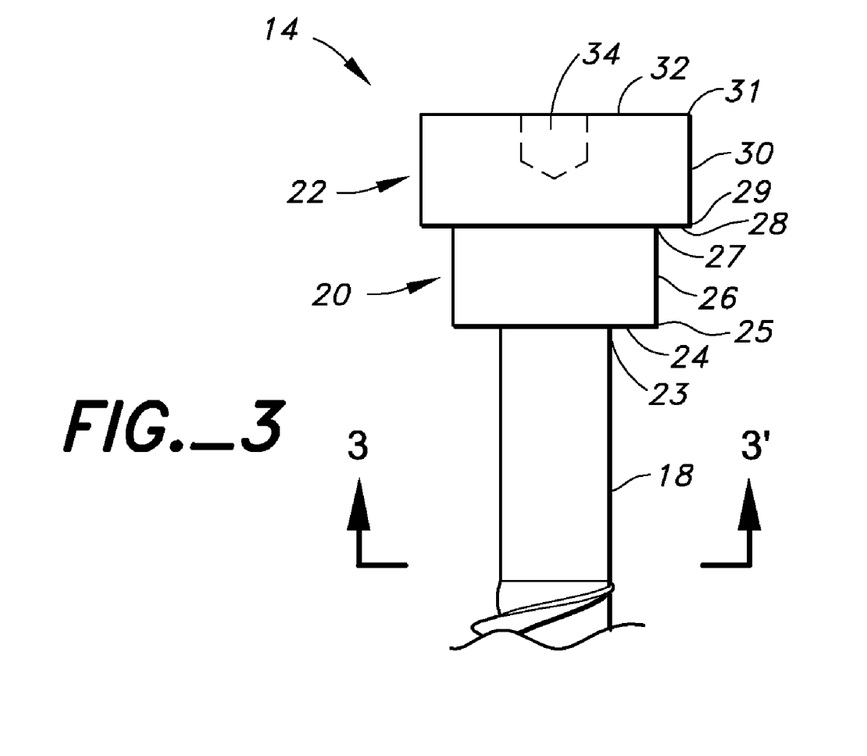
FIG. 3 is an enlarged side view of the head of the screw in FIG. 1.
Figure 9:
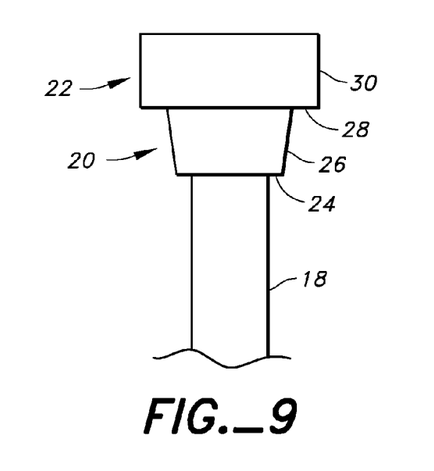

The embodiment of FIG. 9 is identical to that of the embodiment of FIG. 2 with the exception of having a first disc 20 with a frustoconical first side wall 26 which surface is therefore directed not only radially outwardly but also partially forwardly towards the tip.

Figure 10:
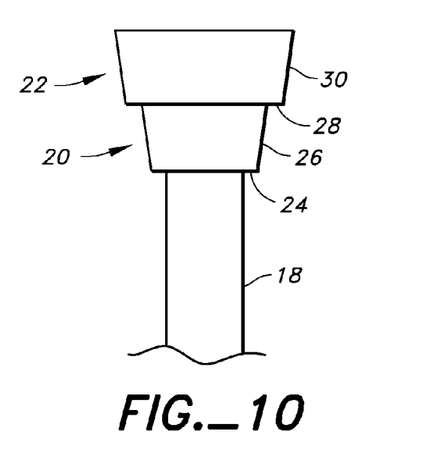

FIG. 10 is a modification of the embodiment of FIG. 1, however, with both the first side wall 26 and the second side wall 30 being frustoconical in the sense that each is disposed at an angle directed not only radially outwardly but also partially forwardly towards the tip.

Figure 11:
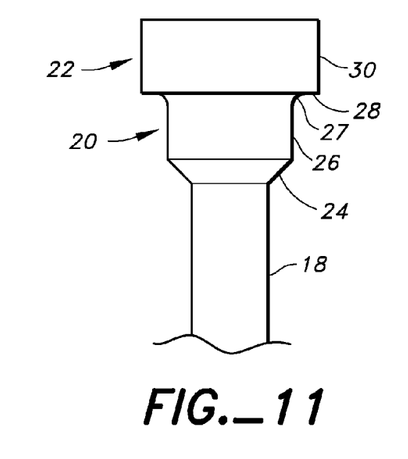

FIG. 11 is a further modification of the embodiment of FIG. 1 in which the first shoulder surface 24 is frustoconical and is directed not only forwardly towards the tip of the screw but also partially radially outwardly. As well, the juncture 27 between the first side wall 26 and the second shoulder surface 28 is radiused.

Figure 12:
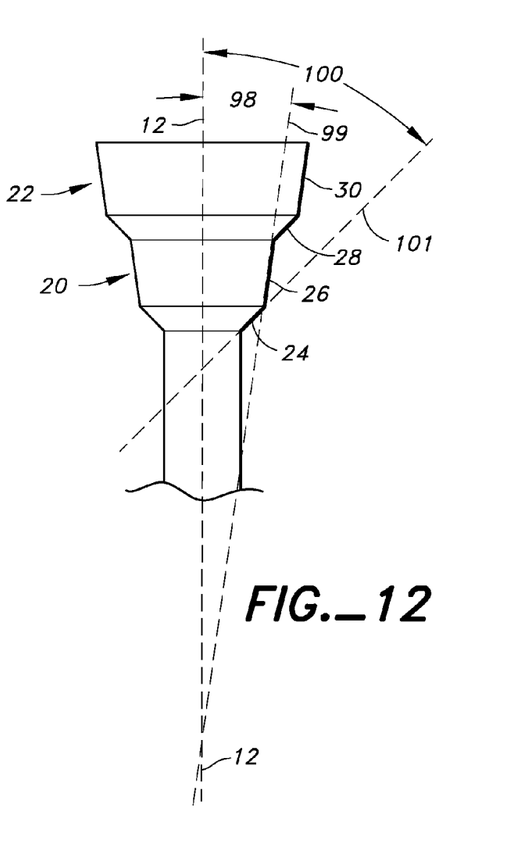

FIG. 12 is a further embodiment in which each of the first shoulder surface 24, first side wall 26, second shoulder surface 28 and second side wall 30 are frustoconical and a line drawn normal to the surfaces of each has a component which extends radially outwardly and a component which extends axially forwardly towards the tip of the screw.

Preferably, the angle 100 formed between a radial extension 101 of a shoulder surface, for example, 24, and the axis is between about 110° and 60°, more preferably between 90° and 60° and, preferably, between 100° and 80°.

Preferably, the angle 98° formed between a radial extension 99 of a side wall, for example, 26, and the axis is between about 0° (in which case they are parallel) and 45°, more preferably, 0° and 30° and, preferably, between 0° and 10°.

Figure 13:
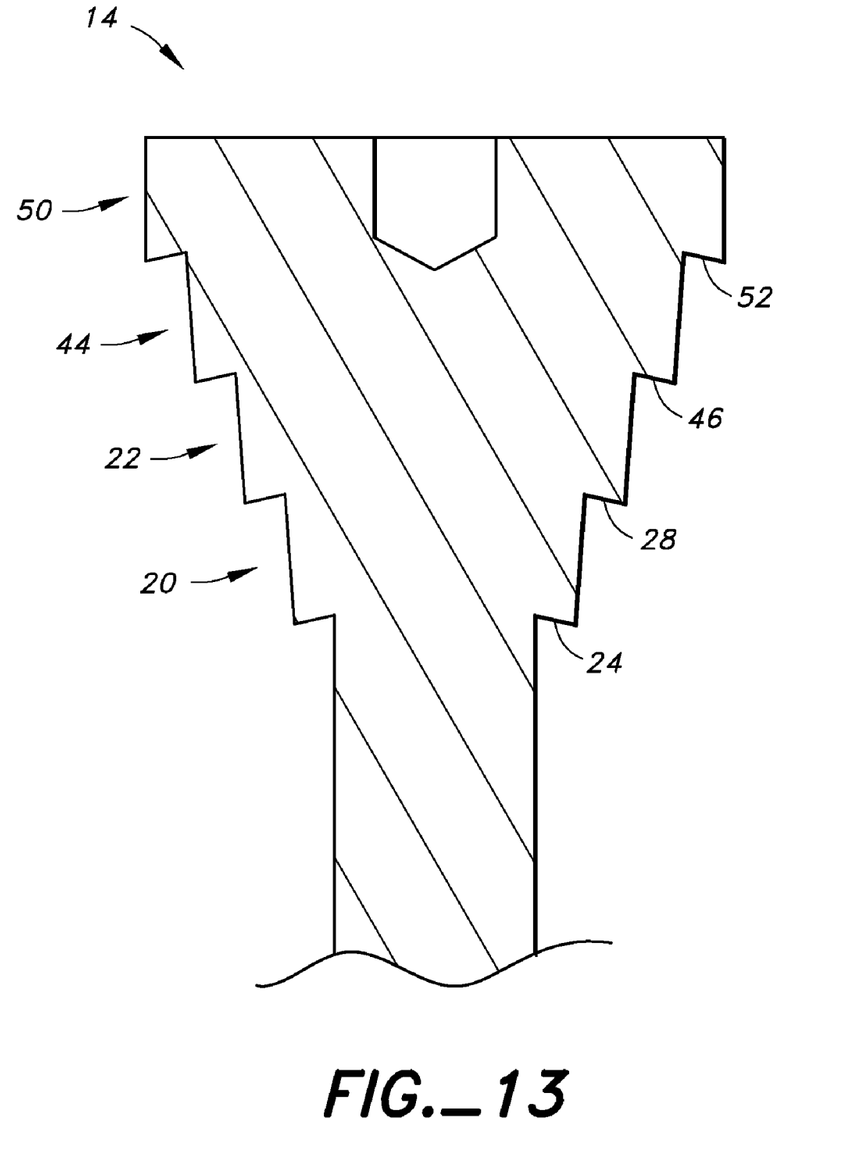
FIG. 13 is a cross-sectional side views of a head of a fastener in accordance with a seventh embodiment of the present invention.

Reference is made to FIG. 13 which shows another embodiment in which the head of the screw has four disc portions, namely, a first disc portion 20, a second disc portion 28, a third disc portion 44 and a fourth disc portion 50. In the embodiment of FIG. 13, each of the disc portions are shown to be substantially identical and the shoulder surfaces of each, namely 24, 28, 46 and 52, is frustoconical directed axially forwardly towards the tip of the screw and radially inwardly towards the screw.

The various embodiments illustrated in FIGS. 1 to 13 have a common feature that a plurality of axially spaced shoulder surfaces are provided with the shoulder surfaces being directed to a greater extent in an axial direction towards the forward end of the screw than in a radial direction. Similarly, the side walls which are disposed between the shoulder surfaces are disposed to be directed radially outwardly away from the axis to a greater extent than the side walls are directed axially towards the forward end of the screw. The embodiments other than FIG. 11 are generally shown with relatively sharp transitions between the various side surfaces and side wall surfaces. As illustrated in FIG. 11, such transitions may be curved surfaces of varying radii appreciating, however, that to the extent that the radius of the curve becomes increased, portions of the curve, in effect, provide a frustoconical-like surface rather than, for example, merely the preferred axial or radial surfaces as shown in FIGS. 1 to 8.

The particular number of shoulder surfaces is not limited and while the preferred fasteners as shown in FIGS. 1 and 8 have two and three shoulders, the screws may have four shoulders as shown in the embodiment of FIG. 13 and may have a greater number of shoulders as, for example, any number as from two to, say, ten as may be practical having regard to the relative size of the screw and the like.

Preferably, the shoulders present as large surfaces as possible directed axially forwardly, preferably normal the axis or at angles close to normal the axis or radially inwardly.

In accordance with the present invention, it is believed to be preferable to have preferred proportions on each disc portion between the size of the annular shoulder 24 and the axial extent of a side wall 26 rearward the shoulder surface. In this regard, it is believed that the ratio of the axial extent of the first side wall 26 as measured parallel the axis to the radial width of first shoulder surface 24 as measured along a radius from the axis, from the juncture 23 with the shank 18 to the lower edge 25 of the first side wall is in the range of: 1:1 to 4:1, more preferably, in the range of 2:1 to 3:1.

The ratio of the axial extent of the side wall to the radial width of the shoulder surface may be constant with each successive disc as is the case in the embodiment illustrated in FIG. 1 or may vary with different discs. Preferably, the ratio of the axial extent of a side wall of a first disc as measured parallel the axis to the axial extent of a side wall measured parallel the axis in the range of about 1:0.66 to 0.66:1.

In the embodiment illustrated in FIGS. 1 to 4, each of the first and second discs have an axial extent equal to about one half of the radius of the shank as is measured over an upper portion of the shank proximate the head, ignoring the thread. In the preferred embodiment of FIGS. 1 to 4, each of the first and second discs have shoulder surfaces 24 and 28 of a width approximately equal to the axial extent of the side surfaces 26 and 30 so as to provide a stepped configuration with steps having an equal radial and axial extent effectively providing the lower edges of the side walls, i.e. lower edge 25 of the first side wall 26 and the lower edge 29 of the second side wall 30 to be located within an imaginary cone which extends at about a 45° angle from the axis.

In the context of threaded fasteners which are to be rotated about their longitudinal axis, it is preferred that the shaft 18 and head 14 be coaxial about the axis 12, that is, on any cross-section normal the axis, the shaft and head be circular and of a respective radius.

Figure 14:
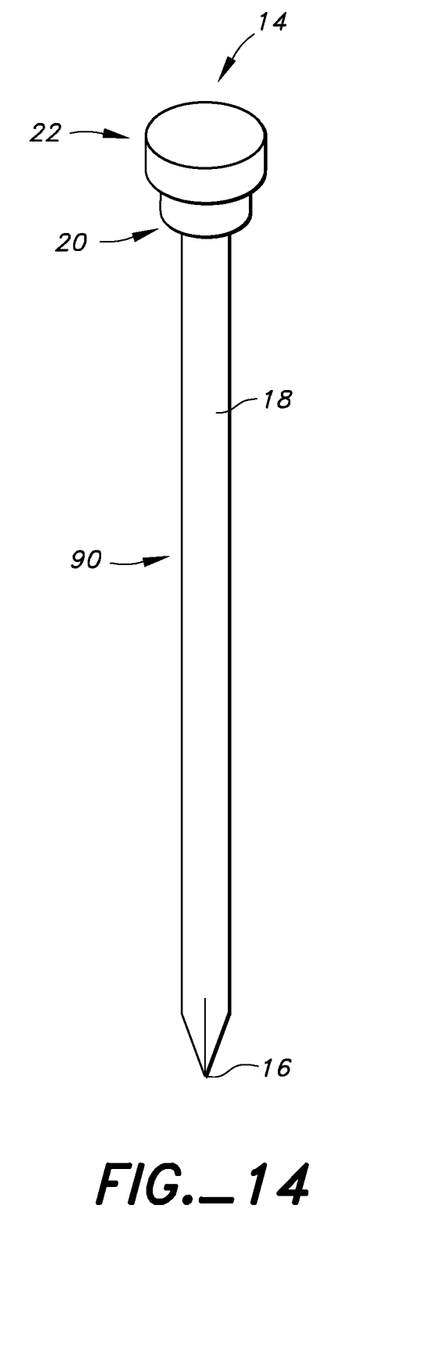
FIG. 14 is a pictorial view of a nail in accordance with an eighth embodiment of the present invention.

Reference is made to FIG. 14 which illustrates a nail 90 in accordance with the present invention and having a head with two disc portions substantially identical to the head illustrated in FIGS. 1 to 4. Such a nail fastener as illustrated in FIG. 14 is adapted to be driven under force into the composite plank and will have sufficient holding strength due to the relative size of the head. The nail will assist in avoiding mushrooming about the sides of the head of the nail by reason of the plurality of spaced shoulder surfaces which will attend to draw the material of the composite planking down into the plank on downward movement of the nail. In the embodiment of FIG. 14, each of the discs are shown to be cylindrical.

Figure 15:
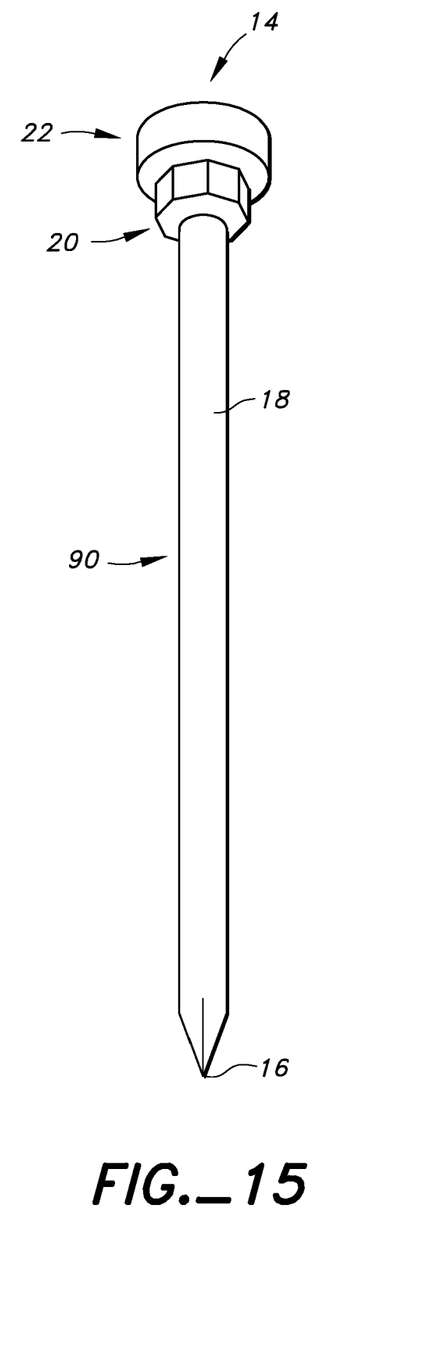
FIG. 15 is a pictorial view of a nail in accordance with a ninth embodiment of the present invention.

Reference is made to FIG. 15 which shows a bottom pictorial view of another embodiment of a nail in accordance with the present invention. In the embodiment illustrated in FIG. 15, the nail is provided with two discs of which an upper disc is cylindrical, however, a lower disc is polygonal shown to have eight sides. It is to be appreciated in the context of a nail insofar as the nail is to be driven merely axially into the composite wood plank, that there is no need for the disc to be circular in cross-section and the nails may have any cross-section normal the axis which is convenient.

The preferred fasteners in accordance with the present invention may be formed from metal and preferably will be corrosion resistant. The fastener need not be made of metal and may be formed from Nylon-type polymers or other materials.

The fasteners in accordance with the present invention may be adapted to be used individually or may be provided in a collated configuration as is known, for example, either as collated screws or collated nails. For example, screws having the preferred configuration in accordance with the present invention could be provided in plastic screwstrips adapted to be driven by autofeed screwdrivers. Known screwstrips of this type are disclosed, for example, in U.S. Pat. No. 5,758,768 to Habermehl, issued Jun. 2, 1998, U.S. Pat. No. 5,819,609 to Habermehl, issued Oct. 13, 1998 and U.S. Pat. No. 4,167,229 to Reich et al, issued Sep. 11, 1979, the disclosures of which are incorporated herein by reference.

While the invention has been described with reference to preferred embodiments, many modifications and variations will now occur to persons skilled in the art. For a definition of the invention, reference is made to the appended claims.

I claim:

1. A method of preventing a portion of composite wood from being displaced above a surface and radially outwardly of a fastener upon insertion of a fastener along a longitudinal axis of the fastener into the composite wood, the fastener having a distal tip for entering into the composite wood before other portions of the fastener, the method comprising the steps of:
   (a) forcing a first amount of the portion of composite wood beneath the surface by contacting the first amount of the portion of composite wood with a first shoulder of the fastener, the first shoulder of the fastener disposed downwardly and outwardly to define a cavity at an angle less than ninety degrees with respect to the longitudinal axis of the fastener to define a frustoconical shoulder directed axially towards the distal tip; and
   (b) forcing a second amount of the portion of composite wood beneath the surface by contacting the second amount of the portion of composite wood with a second shoulder of the fastener, the second shoulder of the fastener disposed generally perpendicular to the longitudinal axis of the fastener.

2. A method of preventing a portion of composite wood from being displaced above a surface and radially outwardly of a fastener as recited in claim 1, said step (a) of forcing a first amount of the portion of composite wood beneath the surface comprising the step of rotating the fastener for threads on the fastener to pull the fastener into the composite wood, the first shoulder being positioned radially outward of the threads.

3. A method of preventing a portion of composite wood from being displaced above a surface and radially outwardly of a fastener as recited in claim 1, said step (b) of forcing a second amount of the portion of composite wood beneath the surface comprising the step of rotating the fastener for threads on the fastener to pull the fastener into the composite wood, the second shoulder being positioned radially outward of the threads.

4. A method of preventing a portion of composite wood from being displaced above a surface and radially outwardly of a fastener as recited in claim 1, said step (a) of forcing a first amount of the portion of composite wood beneath the surface and/or said step (b) of forcing a second amount of the portion of composite wood beneath the surface comprising the step of driving the fastener into the composite wood with an axial load along the longitudinal axis of the fastener.

5. A method of preventing a portion of composite wood from being displaced above a surface and radially outwardly of a fastener upon insertion of a fastener along a longitudinal axis of the fastener into the composite wood, comprising the steps of:
   (a) forcing a first amount of the portion of composite wood beneath the surface by contacting the first amount of the portion of composite wood with a first shoulder of the fastener, the first shoulder of the fastener disposed downwardly and outwardly to define a cavity forming an angle of less than ninety degrees with the longitudinal axis of the fastener; and
   (b) forcing a second amount of the portion of composite wood, located radially outward from the first amount, beneath the surface by contacting the second amount of the portion of composite wood with a second shoulder of the fastener.

6. A method of preventing a portion of composite wood from being displaced above a surface and radially outwardly of a fastener as recited in claim 5, said step (a) of forcing a first amount of the portion of composite wood beneath the surface comprising the step of rotating the fastener for threads on the fastener to pull the fastener into the composite wood, the first shoulder being positioned radially outward of the threads.

7. A method of preventing a portion of composite wood from being displaced above a surface and radially outwardly of a fastener as recited in claim 5, said step (b) of forcing a second amount of the portion of composite wood beneath the surface comprising the step of rotating the fastener for threads on the fastener to pull the fastener into the composite wood, the second shoulder being positioned radially outward of the threads.

8. A method of preventing a portion of composite wood from being displaced above a surface and radially outwardly of a fastener as recited in claim 5, said step (a) of forcing a first amount of the portion of composite wood beneath the surface and/or said step (b) of forcing a second amount of the portion of composite wood beneath the surface comprising the step of driving the fastener into the composite wood with an axial load along the longitudinal axis of the fastener.

* * * * *